United States Patent
Horn et al.

(10) Patent No.: US 11,338,643 B2
(45) Date of Patent: May 24, 2022

(54) HEAT PUMP SYSTEM AND METHOD OF OPERATING SAME

(71) Applicant: Bayerische Motoren Werke Aktiengesellschaft, Munich (DE)

(72) Inventors: Oliver Horn, Munich (DE); Robert Herbolzheimer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 9 days.

(21) Appl. No.: 15/889,476

(22) Filed: Feb. 6, 2018

(65) Prior Publication Data

US 2018/0162193 A1    Jun. 14, 2018

Related U.S. Application Data

(63) Continuation of application No. PCT/EP2016/070914, filed on Sep. 6, 2016.

(30) Foreign Application Priority Data

Sep. 30, 2015 (DE) ...................... 10 2015 218 824.8

(51) Int. Cl.
| | |
|---|---|
| *B60H 1/00* | (2006.01) |
| *B60H 1/32* | (2006.01) |
| *B60H 1/22* | (2006.01) |

(52) U.S. Cl.
CPC ..... *B60H 1/00385* (2013.01); *B60H 1/00899* (2013.01); *B60H 1/00907* (2013.01);
(Continued)

(58) Field of Classification Search
CPC ... B60H 1/00; B60H 1/22; B60H 1/32; B60H 1/00385; B60H 1/00907; B60H 1/3213;
(Continued)

(56) References Cited

U.S. PATENT DOCUMENTS 6,454,180 B2 * 9/2002 Matsunaga ........ B60H 1/00485
165/41
8,161,770 B2 * 4/2012 Takahashi .............. B60H 1/323
165/41
(Continued)

FOREIGN PATENT DOCUMENTS

| | | |
|---|---|---|
| CN | 102563943 A | 7/2012 |
| CN | 204398807 U | 6/2015 |

(Continued)

OTHER PUBLICATIONS

German-language Search Report issued in counterpart German Application No. 10 2015 218 824.8 dated Jun. 9, 2016 with partial English translation (11 pages).
(Continued)

*Primary Examiner* — Harry E Arant
(74) *Attorney, Agent, or Firm* — Crowell & Moring LLP (57) ABSTRACT

A heat pump system for air conditioning a vehicle, in particular an electric or hybrid vehicle, includes an air conditioning unit which has an air conditioning evaporator and a heating heat exchanger, for air conditioning a passenger compartment of the vehicle. A condenser transmits heat from a refrigeration circuit into a coolant circuit, and a chiller transmits heat from the coolant circuit into the refrigeration circuit. The coolant circuit has two branches which are parallel to one another downstream of a low temperature cooler, namely a heating branch which can be shut off and in which the condenser and the heating heat exchanger are arranged, and a cooling branch, in which the chiller and a low temperature heat exchanger for cooling a vehicle component are arranged. The low temperature cooler, the condenser and the heating heat exchanger are connected in series with respect to one another. The heat pump system has a plurality of operating modes.

15 Claims, 1 Drawing Sheet

(52) U.S. Cl.
CPC .............. *B60H 1/22* (2013.01); *B60H 1/3213* (2013.01); *B60H 1/32284* (2019.05); *B60H 2001/00928* (2013.01); *B60H 2001/2237* (2013.01); *B60H 2001/3288* (2013.01); *B60H 2001/3291* (2013.01)

(58) Field of Classification Search
CPC .......... B60H 1/3227; B60H 2001/2237; B60H 2001/00949; B60H 2001/3288; B60H 2001/3291; B60H 1/00899; B60H 1/32284
See application file for complete search history.

(56) References Cited

U.S. PATENT DOCUMENTS

| | | | |
|---|---|---|---|
| 2010/0281901 A1* | 11/2010 | Kawase | B60H 1/00885 62/238.7 |
| 2012/0017637 A1* | 1/2012 | Nakajo | B60H 1/03 62/515 |
| 2012/0085114 A1 | 4/2012 | Graaf et al. | |
| 2015/0266359 A1* | 9/2015 | Haug | B60H 1/3204 62/238.7 |
| 2015/0360543 A1 | 12/2015 | Sondermann et al. | |
| 2016/0159203 A1 | 6/2016 | Kuroda et al. | |
| 2017/0174038 A1 | 6/2017 | Scheldel et al. | |

FOREIGN PATENT DOCUMENTS

| | | | | |
|---|---|---|---|---|
| CN | 104812601 A | | 7/2015 | |
| DE | 101 28 877 A1 | | 12/2002 | |
| DE | 10 2006 042 788 A1 | | 3/2008 | |
| DE | 10 2012 108 043 A1 | | 5/2014 | |
| DE | 10 2014 217 960 A1 | | 3/2016 | |
| ER | 2 437 955 B1 | | 6/2013 | |
| FR | 2946288 A1 | * | 12/2010 | ......... B60H 1/00392 |
| JP | 9-286225 A | | 11/1997 | |
| WO | WO 2010/139582 A1 | | 12/2010 | |
| WO | WO 2014/086443 A1 | | 6/2014 | |
| WO | WO 2015/011918 A1 | | 1/2015 | |

OTHER PUBLICATIONS

International Search Report (PCT/ISA/210) issued in PCT Application No. PCT/EP2016/070914 dated Dec. 5, 2016 with English translation (5 pages).
German-language Written Opinion (PCT/ISA/237) issued in PCT Application No. PCT/EP2016/070914 dated Dec. 5, 2016 (6 pages).
Cover page of European Application No. EP 2 437 955 A1 published Apr. 11, 2012 (1 page).
Chinese-language Office Action issued in counterpart Chinese Application No. 201680037491.4 dated Sep. 19, 2019 with English translation (18 pages).
Chinese-language Office Action issued in Chinese Application No. 201680037491.4 dated Jun. 28, 2020 with English translation (17 pages).

* cited by examiner

HEAT PUMP SYSTEM AND METHOD OF OPERATING SAME

CROSS REFERENCE TO RELATED APPLICATIONS

This application is a continuation of PCT International Application No. PCT/EP2016/070914, filed Sep. 6, 2016, which claims priority under 35 U.S.C. § 119 from German Patent Application No. 10 2015 218 824.8, filed Sep. 30, 2015, the entire disclosures of which are herein expressly incorporated by reference.

BACKGROUND AND SUMMARY OF THE INVENTION

The invention relates to a heat pump system for climate control of a vehicle, in particular an electric or hybrid vehicle, having an air conditioning unit which has an air conditioning evaporator and a heating heat exchanger, for climate control of a passenger compartment of the vehicle, having a condenser, for transmitting heat from a refrigeration circuit into a coolant circuit, and having a chiller, for transmitting heat from the coolant circuit into the refrigeration circuit. The coolant circuit has, downstream of an LT cooler, two branches which are parallel to each other, namely a heating branch which can be shut off and in which the condenser and the heating heat exchanger are arranged, and a cooling branch in which the chiller and at least one vehicle component are arranged.

A corresponding heat pump system is described in the unpublished application DE 10 2014 217 960 originating from the Applicant.

In general, the problem arises in electric or hybrid vehicles that an internal combustion engine which continuously produces heat and an associated high temperature cooling circuit are usually not present, and the heat which is required for heating coolant for the purpose of heating the passenger compartment of the vehicle has to be taken from a different source. However, the coolant heated in this manner usually has too low a temperature level, and therefore frequently use has to be additionally made of a heat pump system in order to bring the coolant to a sufficient temperature level. Appropriate heat sources are, in particular, electrical power components which are customarily arranged in the coolant circuit, i.e. in particular in a low temperature circuit or else simply only a cooling circuit, for example an electric drive machine, i.e. an electric motor, or else electrical power components, such as, for example, inverters, direct current converters, charging electronics or the like. In some circumstances, use of waste heat from a high voltage accumulator, i.e. a battery for supplying the drive machine of the vehicle, is also possible.

However, the different heat sources typically have to be incorporated separately in each case, which results in complex circuitry. In order to then heat or cool the passenger compartment to meet requirements and, at the same time, to cool one or more of the power components, complex circuitry is disadvantageously necessary, frequently with the use of a multiplicity of lines and valves, in particular expensive switching valves. Particularly under the aspect of interior climate control, various operating states customarily necessitate corresponding settings in which the heat is intended to be conducted differently in each case either into the interior and/or into the environment, as a result of which, in turn, a multiplicity of valves, in particular complex valves, is required, as is a complicated control unit. This leads to a high outlay particularly in the case of electric vehicles since here, as described above, overall less heat is available, the efficient distribution of which then becomes all the more critical.

The invention is therefore based on the object of providing an improved heat pump system for a vehicle, in particular for an electric or hybrid vehicle, which is constructed as simply and in particular as cost effectively as possible and permits cooling and heating of a passenger compartment of the vehicle.

The object is achieved according to the invention by a heat pump system, and method of operating same, for climate control of a vehicle, in particular an electric or hybrid vehicle, having an air conditioning unit which has an air conditioning evaporator and a heating heat exchanger, for climate control of a passenger compartment of the vehicle, having a condenser, for transmitting heat from a refrigeration circuit into a coolant circuit, and having a chiller, for transmitting heat from the coolant circuit into the refrigeration circuit. The coolant circuit has, downstream of an LT cooler, two branches which are parallel to each other, namely a heating branch which can be shut off and in which the condenser and the heating heat exchanger are arranged, and a cooling branch in which the chiller and at least one vehicle component are arranged. The LT cooler, the condenser and the heating heat exchanger are connected to one another in series. Advantageous refinements, developments and variants are described and claimed herein. The developments and advantages mentioned in conjunction with the heat pump system also apply analogously to the method and vice versa.

The heat pump system is designed for climate control of a vehicle, in particular an electric or hybrid vehicle, and has an air conditioning unit which, in turn, has an air conditioning evaporator and a heating heat exchanger, for climate control of a passenger compartment of the vehicle. The heat pump system furthermore has a condenser or alternatively a gas cooler, for transmitting heat from a refrigeration circuit into a coolant circuit, and a chiller, for evaporating refrigerant and for transmitting heat from the coolant circuit into the refrigeration circuit. The coolant circuit has an LT cooler and, downstream thereof, two branches which are parallel to each other, namely a heating branch which can be shut off and in which the condenser and the heating heat exchanger are arranged, and a cooling branch in which the chiller and at least one vehicle component to be cooled are arranged. The LT cooler, the condenser and the heating heat exchanger are connected to one another in series, i.e. consecutively.

An advantage achieved with the invention consists in particular in that, because of the special interconnection of the diverse components of the heat pump system to one another, a particularly efficient construction is realized. The heat pump system according to the invention takes up particularly little construction space; furthermore, weight and costs are significantly reduced. Essential in this connection is in particular the series connection of the heating heat exchanger and of the condenser in the heating branch in combination with a series connection with respect to the LT cooler. In this configuration, coolant which is heated by means of the condenser flows, in particular permanently, through the heating heat exchanger, and therefore a customarily expensive switchover valve for diverting the coolant to the heating heat exchanger is not required and therefore such a switchover valve is preferably also omitted. In order to heat the passenger compartment by way of the heating heat exchanger, the heating branch is customarily shut off and is opened only when there is an excess of heat in the vehicle, i.e. more heat is present in the coolant circuit than is required for heating the interior. In this case, heat is additionally removed via the LT cooler by coolant of the heating branch being conducted via the LT cooler. If there is no excess of heat, the heating branch is operated in shut-off form, and therefore heat is removed exclusively at the heating heat exchanger for the purpose of heating the interior.

Further advantages arise in particular from the parallel connection of the two branches of the coolant circuit. Firstly, when the heating branch is shut off, circulation of coolant for cooling the vehicle component is furthermore ensured. Secondly, the parallel circuit permits a parallel arrangement of the condenser and of the chiller, and therefore a reduced quantity of coolant in comparison to a series arrangement flows in particular through the latter. In particular, in this configuration, the quantity of volumetric flow of coolant is approximately halved in comparison to a configuration in which the chiller is not arranged in a parallel branch. As a result, a pressure loss with respect to the coolant that typically occurs at the chiller is significantly reduced in an advantageous manner, in particular to approximately a quarter in comparison to a non-parallel arrangement, as a result of which, in turn, a greater quantity of coolant per time can be conveyed through the cooling branch. This then leads overall to improved cooling of the vehicle components likewise connected in the cooling branch. Furthermore, the chiller is preferably designed to have correspondingly small dimensions, for example for a conveying quantity of up to 1000 l/h, and is then more cost effective. Furthermore, the arrangement of the heating heat exchanger in series with the condenser and the LT cooler and the saving on a switchover valve result in a simpler and more operationally reliable control strategy, by means of which a more stable and in particular acoustically less conspicuous operation of the heat pump system in the vehicle is possible.

The coolant circuit is a cooling circuit in which a coolant, for example a water/glycol mixture, is circulated. Depending on the operating mode and environmental conditions, a temperature of, for example, approximately −25 to +70 or even to +90° C. is present in the coolant circuit, in particular in the cooling branch. Depending on the operating mode, a temperature, for example, likewise within the range of −25 to +90° C. is present in the heating branch, wherein, at a given time, the temperature in the heating branch regularly differs from the temperature in the remaining coolant circuit, particularly in the driving mode of the vehicle.

The coolant circuit therefore comprises a plurality of portions, in particular three portions, which are connected to one another at two junctions. The LT cooler is arranged in the first portion. The second portion comprises the heating branch which is connected to the first portion via a feed and a return. The feed and the return are in particular likewise parts of the second portion here. The third portion is the cooling branch for vehicle components. One of the junctions is then arranged downstream of the first portion as the first junction. At said first junction, the feed of the heating branch and the cooling branch begin. Downstream of the two branches, the cooling branch and the return of the heating branch are brought together at the other junction as the second junction and open jointly into the first portion.

Arranged in the refrigeration circuit is a compressor, for compressing refrigerant, as a result of which the latter is brought to a higher temperature level. The compressor is arranged here downstream of the air conditioning evaporator and of the chiller and upstream of the condenser. The compressor is in particular what is referred to as an electrical refrigerant compressor, ERC for short.

Depending on the refrigerant used, a condenser is understood very generally as meaning a heat exchanger for outputting heat from the refrigeration circuit. Accordingly, for example when $CO_2$ is used, also referred to as R744, a gas cooler is then used instead of a conventional condenser.

The air conditioning unit serves for climate control of the interior, i.e. heating or cooling of the passenger compartment, and, for this purpose, has two heat exchangers, wherein the one heat exchanger is the heating heat exchanger and the other is the air conditioning unit evaporator. The heating heat exchanger is arranged in the heating branch and therefore also in the coolant circuit here and serves, in particular in a heating mode of the heat pump system, to output heat to the passenger compartment. The air conditioning unit evaporator is arranged in the refrigeration circuit and serves, in particular in a cooling mode of the heat pump system, to absorb heat into the refrigeration circuit. In particular, a valve is arranged in the refrigeration circuit upstream of the air conditioning unit evaporator, said valve being closed in the, in particular pure, heating mode, that is to say in the exclusive heating mode, and serving as an expansion member in the cooling mode.

In particular, for cooling the interior, depending on requirements, heat is taken from air from the passenger compartment in a recirculation mode, and/or heat is taken from external air, which is supplied to the passenger compartment, in an external air mode.

The condenser and the chiller in particular together with the compressor jointly form a heat pump, for transmitting heat between different points of the coolant circuit, in particular from the cooling branch into the heating branch. In this manner, particularly efficient transmission of heat for supplying the heating heat exchanger is realized in the heating branch by the heat pump.

The condenser is designed in particular as a water-cooled condenser and has a refrigerant condenser and a condenser heat exchanger, which are coupled thermally to each other. In this case, the refrigerant condenser is connected to the refrigeration circuit and the condenser heat exchanger is connected to the coolant circuit. The chiller has a refrigerant evaporator and a chiller heat exchanger, which are coupled thermally to each other, wherein the chiller evaporator is connected to the refrigeration circuit and the chiller heat exchanger is connected to the coolant circuit. The condenser and the chiller therefore each have in particular four connections, namely in each case two feeds and two returns, wherein in each case one feed and return is connected to the coolant circuit and the other feed and return is connected to the refrigeration circuit.

The heat pump expediently takes heat from the surroundings of the vehicle via the LT cooler or from the vehicle component from the cooling branch. For this purpose, the LT cooler, the at least one vehicle component and the chiller are connected to one another in series, wherein the chiller is preferably arranged downstream of the vehicle components to be cooled and in the spatial vicinity thereof in order to obtain as efficient transmission of heat as possible from the vehicle component to be cooled to the chiller. In general, in the event of a plurality of vehicle components to be cooled, said vehicle components are preferably each connected upstream of the chiller and in series therewith and, as far as possible, are also arranged in the spatial vicinity of the chiller. In principle, it is possible here to integrate the vehicle components in the coolant circuit in series with one another and/or parallel to one another. The vehicle component is, for example, an electronic power unit, an electric motor for driving the vehicle or a high voltage accumulator for supplying energy. A respective vehicle component to be cooled is customarily thermally coupled to the coolant circuit via a suitable heat exchanger in order to output heat to the coolant.

For the heating of the interior, in a first variant, heat is absorbed from the surroundings via the LT cooler, said heat is transmitted into the refrigeration circuit via the chiller, the refrigerant is brought to a higher temperature level by means of the compressor, and the heat is then transmitted again by means of the condenser into the coolant circuit and supplied from there to the heating heat exchanger. In this configuration, use is then made in particular of the surroundings of the vehicle as the heat source for the heat pump. Alternatively or additionally, heat is supplied in this manner from the vehicle components to be cooled to the heating heat exchanger. If, for example, no heat or insufficient heat can be taken from the vehicle components, at least waste heat from the surroundings is advantageously available in order to be transmitted via the chiller and the water-cooled refrigerant condenser to the heating heat exchanger.

The heating heat exchanger is expediently arranged downstream of the condenser. This ensures a particularly efficient supply of heat from the condenser to the heating heat exchanger. The coolant then also has as low a temperature as possible at the feed of the condenser, as a result of which the efficiency of the condenser is improved.

In an advantageous development, the heating heat exchanger and the condenser are also accommodated in a spatial vicinity to each other in the vehicle, i.e., for example, together in the front or in the rear region of the vehicle, as a result of which the length of a line for connecting the two components is particularly short, for example less than 1 m.

A shut-off valve is preferably arranged for shutting off the heating branch, said shut-off valve being significantly more cost effective in particular in relation to a switching or switchover valve. The shut-off valve in particular has merely two switching states, namely open and closed, i.e. shut off. In the open state, the heating branch is then correspondingly also open, and is also closed, i.e. shut off, in the closed state.

The shut-off valve is arranged in the feed or in the return to the heating branch, specifically, for example, upstream of the condenser and the heating heat exchanger or downstream of the two. An arrangement of the shut-off valve upstream of the condenser, i.e. in the feed, is particularly preferred here. In the shut-off state, and in particular in the heating mode, there is the risk of heat exchange with the coolant from the remaining coolant circuit, i.e. an exchange of the coolant itself, taking place at the two junctions. Since the coolant in the heating branch is typically warmer than in the remaining coolant circuit, a potential loss of heat arises here. This is generally greater downstream of the LT cooler and at the first junction upstream of the heating branch than downstream of the heating branch, and therefore an arrangement of the shut-off valve in the feed of the heating branch upstream of the condenser is particularly expedient. The first junction at which coolant coming from the LT cooler is split between the two branches is then located upstream of the shut-off valve. By provision of a shut-off in the feed of the heating branch, the coolant is then completely conducted via the cooling branch and is prevented from flowing through the heating branch.

In order, in particular in the shut-off state of the heating branch, to realize a preferably continuous circulation of coolant through the condenser and the heating heat exchanger, in an expedient refinement a heating loop is formed having a recycling branch which branches off from the heating branch downstream of the heating heat exchanger and upstream of the condenser. Consequently, coolant is recycled by means of the recycling branch, specifically in particular in such a manner that the recycling branch branches off from the heating branch at a first branching-off point downstream of the heating heat exchanger and is then connected again to the heating branch upstream of the condenser at a second branching-off point. By means of the heating loop, circulation of coolant is then possible in a particularly simple manner.

In order, in particular in the open state of the heating branch, to avoid a diversion of coolant via the recycling branch and therefore bypassing of the condenser and the heating heat exchanger, in an advantageous development a valve, in particular a particularly cost effective nonreturn valve, is arranged in the recycling branch. As a result, in particular a bypass effect of the recycling branch is then eliminated. For this purpose, the nonreturn valve is oriented in such a manner that only a coolant flow from the first branching-off point toward the second branching-off point is possible, and not vice versa. The use of a shut-off valve is basically also conceivable.

Owing to the fact that preferably only the nonreturn valve is arranged in the recycling branch, i.e. otherwise no further components, the recycling branch as a whole is configured particularly compactly and is therefore particularly simple to ventilate. A dedicated equalizing container in the heating branch is therefore expediently also omitted, as a result of which the heat pump system is significantly simpler both structurally and in operation.

Particular advantages emerge from the combination of the refinements with the shut-off valve in the heating branch and in the recycling branch with the nonreturn valve. This refinement is particularly simple structurally since overall particularly simple and cost effective valves are used here. Switchover valves and/or metering valves which are expensive in comparison thereto are preferably omitted.

In a preferred refinement, setting of a certain temperature, i.e. a target temperature, in the passenger compartment is simplified in particular by the fact that the air conditioning unit has an air duct, for supplying air into the passenger compartment, wherein the heating heat exchanger is arranged in the air duct downstream of the air conditioning evaporator, and wherein the air duct has an air bypass for bypassing the heating heat exchanger. For example, a switch, in general a mixed air control, is then arranged in the air duct, by means of which inflowing air is conducted completely or partially past the heating heat exchanger. If heated coolant flows through the heating heat exchanger on the coolant side, cooling of the interior is nevertheless possible by the air which is introduced into the passenger compartment by means of the air duct not being conducted via the heating heat exchanger, but rather past the latter via the air bypass. Particularly advantageous is a merely partial bypass in combination with air being supplied via the air conditioning evaporator, which can be activated or inactive, as a result of which the temperature in the passenger compartment can then be set in particular independently of the temperature of the coolant in the heating heat exchanger.

By means of the mixed air control, a certain temperature for the air flowing through the air duct is expediently set in order to bring the passenger compartment to a corresponding temperature. For this purpose, the mixed air control sets a quantity or volume ratio between two portions of the air, namely a hot portion, which is conducted via the heating heat exchanger, and a cold portion, which is conducted via the air bypass.

For the setting of a certain coolant flow through the heating branch, i.e. in particular for conveying coolant through the heating branch, a heating circuit pump is expediently arranged in the latter. By means of said heating circuit pump, coolant is also circulated in particular in the shut-off state, i.e. is conveyed along the heating loop. The heating circuit pump is in particular arranged upstream of the condenser.

The heating circuit pump is preferably not arranged in the recycling branch, but rather in the heating loop. As a result, it is then advantageously possible to realize a coolant flow which is suitable in each case through the respective branch, depending on the cooling requirement of the vehicle component in the cooling branch and depending on the heating requirement at the heating heat exchanger in the heating branch. In other words: a first volumetric flow flows through the heating branch and a second volumetric flow flows through the cooling branch, and the two volumetric flows form a volumetric flow ratio which is set to meet requirements by means of the heating circuit pump. In particular, for this purpose, the heating circuit pump has a rotational speed which can be set and which is suitably varied.

In an expedient variant, an auxiliary heater is arranged in the coolant circuit between the condenser and the heating heat exchanger. Said auxiliary heater is expediently switched on, i.e. activated, as an additional heat source if the heat introduced into the heating branch via the condenser does not suffice to sufficiently satisfy a given heating requirement. The auxiliary heater is, for example, an electrically operated heater or PTC heater or a fuel-operated burner.

The heat pump system preferably has a control unit which is designed in such a manner that the heat pump system is switched over between a plurality of operating modes, namely at least a cooling mode, for cooling the interior, and a heating mode, for heating the interior. For this purpose, the control unit in particular opens and closes the feed or the return to the heating branch and, to this end, in particular switches the shut-off valve. Furthermore, the control unit switches, controls or regulates one or more of the following components: heating circuit pump in the heating branch, expansion valve or expansion valves in the refrigeration circuit, mixed air control, air bypass in the air duct, auxiliary heater, compressor, LT cooler bypass, electric fan for supplying air for the LT cooler, and preferably also determines a recommendation for activating a coolant pump upstream of the LT cooler.

In a preferred refinement, the heat pump system has a heating mode, which is also referred to as winter mode and in which the heating branch is shut off and the chiller is activated. An activated chiller is understood here as meaning in particular that an expansion valve which is connected upstream of the chiller in the refrigeration circuit is at least partially open and heat exchange between coolant circuit and refrigeration circuit takes place by means of the chiller. Consequently, in particular the heat pump is also active and supplies heat to the heating branch. Said heat is then output to the passenger compartment via the heating heat exchanger in the air conditioning unit. The heating mode therefore serves for heating the passenger compartment.

In a further preferred refinement, a valve, in particular expansion valve, for setting a cooling capacity of the air conditioning evaporator, is arranged in the refrigeration circuit upstream of the air conditioning evaporator, wherein, in a first mixed mode, both the air conditioning evaporator and the heating heat exchanger are activated. This is understood as meaning in particular that there is a heating requirement at the same time as the air conditioning evaporator is active. In other words: the air conditioning evaporator absorbs heat, i.e. provides a certain cooling capacity, and at the same time the heating heat exchanger outputs heat, i.e. prepares a certain heating capacity. In particular, the chiller is also active in this case in order to provide heat for the heating heat exchanger. The first mixed mode is then in particular characterized by the fact that the cooling capacity is typically low and the heating capacity high, and therefore in particular the cooling capacity is lower than the heating capacity. Consequently, starting from the heating mode, i.e. the winter operation, the first mixed mode presents a transition mode for comparatively low external temperatures, for example within the range of 0 to 15° C.

The first mixed mode differs here from the heating mode in particular by the additional extraction of heat by means of the air conditioning evaporator. The latter is activated here in particular by the fact that the expansion valve which is connected upstream of the air conditioning evaporator is at least partially open. As a result, in the first mixed mode, in particular a dehumidification mode is realized, in which, by means of simultaneous heating and cooling, the air which is supplied to the passenger compartment via the air duct is dehumidified. In this manner, in particular misting of window panes of the vehicle is also advantageously prevented, i.e. they are kept free from misting. In the air conditioning unit, the air is then initially cooled by means of the air conditioning evaporator, in particular in such a manner that humidity which is contained in the air is condensed and in particular also trapped. Subsequently, said air is conducted via the heating heat exchanger and heated again, for example to a target temperature set by the user of the vehicle.

A valve, in particular expansion valve, for setting the overheating of the refrigerant upstream of the chiller and therefore for setting the mass flow of refrigerant through the chiller, i.e. in general for setting the quantity of heat which the chiller transmits from the coolant circuit, is arranged in the refrigeration circuit upstream of the chiller.

In a second mixed mode, the quantity of heat is preferably reduced in relation to a maximum quantity by the mass flow of refrigerant which flows through the chiller being reduced by means of the expansion valve assigned to the chiller. The heat pump system therefore has a second mixed mode which, like the first mixed mode, is a transition mode in which reduced heating of the passenger compartment in comparison to the heating mode now takes place by the heat transmitted by the heat pump to the heating heat exchanger being reduced. In other words, the heat pump is operated in a reduced mode since otherwise more heat would be present for outputting to the interior than is required in the present operating case.

This second mixed mode is used or set in particular at higher external temperatures than the first mixed mode, for example within a range of 5 to 20° C. Said second mixed mode is then characterized in particular by the fact that the cooling capacity of the air conditioning evaporator is typically greater than in the first mixed mode, and the heating capacity of the heating heat exchanger is lower than in the first mixed mode.

A particular advantage of the second mixed mode consists in particular in that, during the latter, the shut-off valve remains continuously and completely closed and, nevertheless, by setting the chiller, regulation of the supply of heat into the heating branch to meet requirements is ensured. For this purpose, the expansion valve which is assigned to the chiller in the refrigeration circuit is opened, in particular starting from the heating mode, in order to obtain a reduced expansion of refrigerant and therefore a lower absorption of heat from the coolant circuit.

In a further preferred refinement, the heat pump system has a third mixed mode which preferably becomes active only if a small quantity of heat is removed via the heating heat exchanger to the interior and there is the risk of the closed heating circuit becoming overheated. In said third mixed mode, the heating branch is temporarily opened. Via the feed of the heating branch, cooler coolant is supplied to the heating branch and at the same time warmer coolant is supplied in the return to the LT cooler and therefore heat is extracted from the heating circuit to meet requirements and is removed via the LT cooler. Temporarily open is understood here as meaning in particular opening for a period of time of some or a few seconds or a few hundred milliseconds.

The mixed modes each constitute a possibility of setting the quantity of heat supplied to the heating heat exchanger to meet requirements. In addition, the three mixed modes are in particular transition modes between the winter mode and the summer mode, for particularly flexible climate control of the vehicle in the case of particularly many different requirements, for example because of different external temperatures at different times of the year. In a suitable variant, a heat deficit is additionally also compensated for by means of the auxiliary heater (already described above) in the heating mode and/or in one or more of the mixed modes.

In a further preferred refinement, the heat pump system has a cooling mode, also referred to as a summer mode, in which the heating branch is in particular open continuously and the chiller is deactivated. A deactivated chiller is understood as meaning in particular that the expansion valve which is assigned to the chiller in the refrigeration circuit is completely closed, and/or the refrigerant only still flows through the air conditioning evaporator and then no longer through the chiller, and therefore heat is not exchanged between the coolant circuit and the refrigeration circuit by means of the chiller.

In addition, in the summer mode, the passenger compartment is cooled in particular by means of the air conditioning evaporator. The heat absorbed by means of the latter in the refrigeration circuit is then furthermore introduced into the heating branch via the condenser. However, removal of heat via the LT cooler is ensured here by the open heating branch while no substantial quantity of heat is output at the heating heat exchanger. Inadvertent heating of the passenger compartment is ensured in particular by appropriate diversion of air via the air bypass, bypassing the heating heat exchanger. Overall, in the cooling mode, any heat in the coolant circuit is therefore advantageously removed via the LT cooler.

A further particular advantage of the special circuitry of the heat pump system arises in particular by the fact that, apart from in the third mixed mode, clocking of valves in the coolant circuit is preferably as far as possible dispensed with and therefore a customarily annoying noise input due to periodic switching is avoided.

The compressor is arranged in the refrigeration circuit between the air conditioning evaporator and the condenser and supplies compressed refrigerant to the latter for outputting heat to the coolant circuit. The chiller, which acts as an evaporator in the refrigeration circuit, and the air conditioning evaporator are connected in parallel to each other. In the cooling mode, heat is then absorbed into the refrigeration circuit at least via the air conditioning evaporator, whereas, in the heating mode, this predominantly takes place via the chiller. A simultaneous absorption of heat via both components is basically also conceivable and is possible and preferably also provided in the mixed modes described. In addition, the compressor has a certain compressor capacity which can preferably be set, as a result of which the heat exchange between coolant circuit and refrigeration circuit, in particular the heat exchange by means of the chiller and/or the condenser, is then expediently also set.

In a variant, at least one further evaporator is connected to the refrigeration circuit, for example for cooling a high voltage accumulator of the vehicle, wherein the further evaporator is then arranged parallel to the chiller and parallel to the air conditioning evaporator such that then three evaporator branches which are parallel to one another are formed. Each evaporator is also in particular assigned an expansion valve in each case in order to set the respectively transmitted quantity of heat.

To increase capacity and efficiency, in a preferred refinement, an internal heat exchanger which couples a feed and a return of the chiller in the refrigeration circuit thermally to each other is additionally arranged in the refrigeration circuit. The internal heat exchanger therefore transmits heat from a high pressure side of the refrigeration circuit lying upstream of the chiller, i.e. upstream of the corresponding expansion valve, to a low pressure side lying downstream of the chiller. At the same time, thermal coupling of a feed and a return of the air conditioning evaporator expediently also takes place in a similar manner by means of the internal heat exchanger, as a result of which in particular the efficiency of the air conditioning evaporator is also significantly improved. The abovementioned embodiment in which feed and return of the chiller and of the air conditioning evaporator are jointly coupled by means of the internal heat exchanger is suitable particularly for a vehicle in which the entire refrigeration circuit is arranged either in the front or in the rear region of the vehicle.

In an alternative configuration in which some of the components of the refrigeration circuit are arranged in the rear region of the vehicle and some in the front region, a possibly extensive refrigerant line system then arises, however. In order in particular also in this case to realize as compact a constructional form as possible and to save on refrigerant lines, the air conditioning evaporator is preferably connected parallel to the internal heat exchanger and the chiller, and a further internal heat exchanger is arranged which couples a feed and a return of the air conditioning evaporator thermally to each other. The chiller and the air conditioning evaporator are therefore each equipped with a separate internal heat exchanger and are then installed with a significantly reduced outlay on lines at different points of the vehicle. The two internal heat exchangers are then accommodated at different points in the vehicle and in a manner separated spatially from each other. For example, the compressor and the chiller with the internal heat exchanger are then accommodated in the rear region of the vehicle, and the condenser and the air conditioning evaporator with the further internal heat exchanger are accommodated in the front region.

In an expedient development, the coolant circuit has an LT cooler bypass, i.e. a bypass line for bypassing the LT cooler. The LT cooler bypass is therefore connected in particular parallel both to the LT cooler and to the two branches. A valve, preferably a particularly cost-effective shut-off valve, is arranged in the LT cooler bypass, for activating the latter. A switchover valve for diverting coolant either via the LT cooler or via the LT cooler bypass is therefore advantageously dispensed with. This is made possible in particular by the fact that there is a pressure loss at the LT cooler, which pressure loss, in the event of an open valve, i.e. in the event of the activated LT cooler bypass, leads to a significantly lower volumetric flow through the LT cooler. This makes it possible, in the heating mode and in the mixed mode, to keep heat of the coolant circuit for heating and to not lose heat to the surroundings. Particularly in the mixed mode, heat which is not removed from the coolant circuit by the chiller is possibly unintentionally removed via the LT cooler connected downstream to the surroundings of the vehicle. In order to prevent this, i.e. in order to keep the heat not specifically required for heating in the vehicle, the LT cooler bypass is then opened in order to conduct the volumetric flow of coolant past the LT cooler.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE, FIG. 1, schematically shows an exemplary embodiment of a heat pump system for a vehicle according to the invention.

DETAILED DESCRIPTION OF THE DRAWINGS

Figure 1:
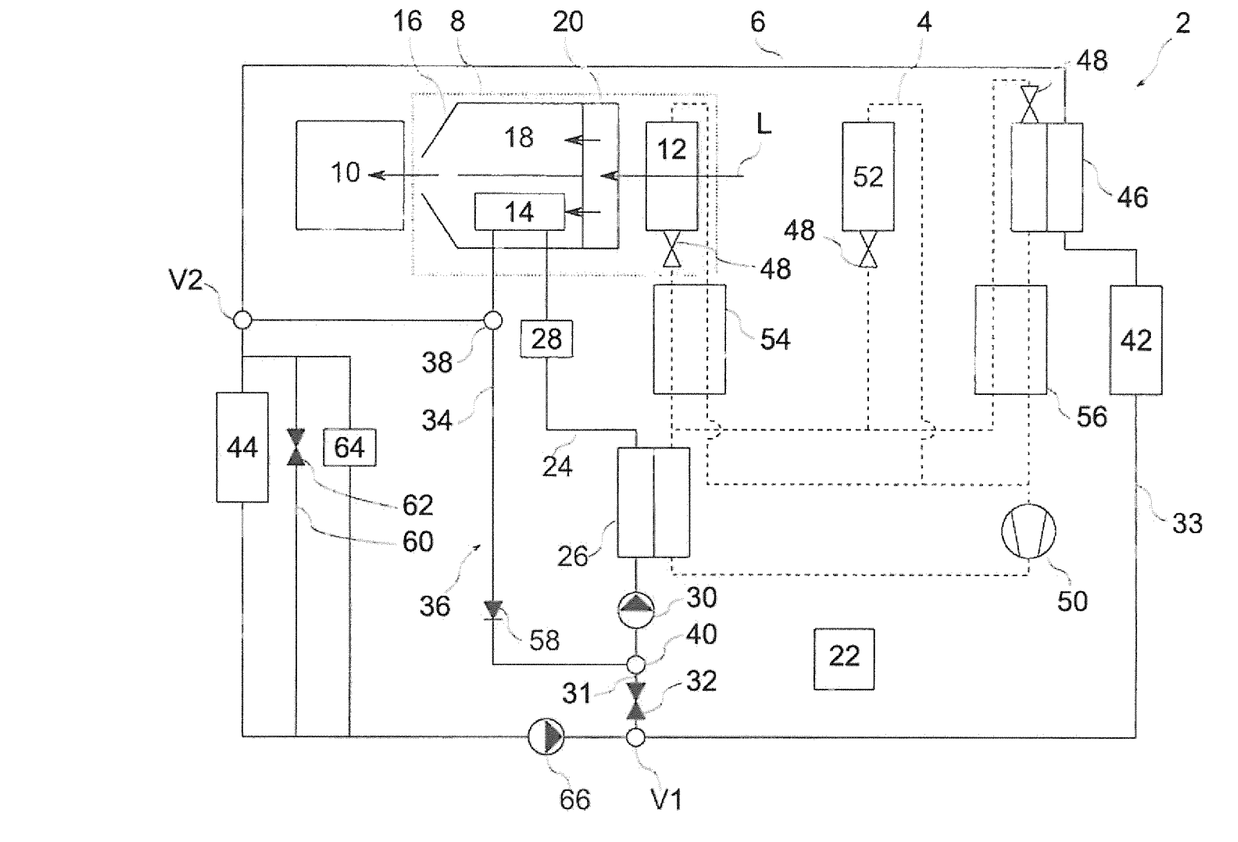

FIG. 1 illustrates a heat pump system 2 for a vehicle (not shown specifically), in particular for an electric vehicle or a hybrid vehicle. The heat pump system 2 has a refrigeration circuit 4 in which a refrigerant circulates, and a coolant circuit 6, in which a coolant, for example a water/glycol mixture, circulates. The refrigeration circuit 4 is illustrated in FIG. 1 with a dashed line, and the coolant circuit 6 with a solid line. The coolant circuit 6 is a cooling circuit in which the coolant customarily has a temperature of between approximately −25 to +70° C. or even up to +90° C. The heat pump system 2 furthermore has an air conditioning unit 8, for climate control of a passenger compartment 10, i.e. an interior, of the vehicle. For this purpose, the air conditioning unit 8 has an air conditioning evaporator 12 which is connected to the refrigeration circuit 4, and a heating heat exchanger 14, which is connected to the coolant circuit 6. The air conditioning evaporator 12 then serves for cooling the passenger compartment 10, and the heating heat exchanger 14 serves for heating.

Furthermore, the air conditioning unit 8 comprises an air duct 16 for feeding air L into the passenger compartment 10. The heating heat exchanger 14 is arranged downstream of the air conditioning evaporator 12 with respect to the inflowing air L, and therefore, depending on the operation of the two components, the air L is heated, cooled or both. In order to bypass the heating heat exchanger 14, the air duct 16 has an air bypass 18 via which the air L downstream of the air conditioning evaporator 12 can be conducted partially or even completely past the heating heat exchanger 14. In order to divide the air L between the heating heat exchanger 14 and the air bypass 18, the air duct 16 has a mixed air control 20 which is designed, for example, as an adjustable switch.

The heat pump system 2 can first of all be switched over between a heating mode and a cooling mode by way of a control unit 22. In the heating mode, the passenger compartment 10 is heated by means of the heating heat exchanger 14, whereas, in the cooling mode, the passenger compartment 10 is cooled by means of the air conditioning evaporator 12. The heat used for heating is supplied to the heating heat exchanger 14 via the coolant circuit 6. For this purpose, the heating heat exchanger 14 is connected to the coolant circuit 6 in a heating branch 24. A condenser 26 is likewise connected in said heating branch 24, for transmitting heat from the refrigeration circuit 4 into the coolant circuit 6. The condenser 26 is designed here as a water-cooled condenser, with a suitable heat exchanger which is connected to the coolant circuit 6. In the exemplary embodiment shown here, an auxiliary heater 28 as a further heat source is additionally arranged in the heating branch 24, specifically upstream of the heating heat exchanger 14 and downstream of the condenser 26. Furthermore, a heating circuit pump 30 is arranged in the heating branch 24, specifically upstream of the condenser 26, for conveying coolant.

In FIG. 1, the coolant circuit 6 comprises three portions which are connected to one another at two junctions V1, V2. The LT cooler 6 is arranged in a first portion. The second portion is the heating branch 24 with a feed 31 and a return (not denoted specifically). The third portion is a cooling branch 33. One of the junctions V1, V2 is then arranged downstream of the first portion as the first junction V1. At said first junction V1, the feed 31 of the heating branch 24 and the cooling branch 33 begin. Downstream of the two branches 24, 33, said branches are brought together at the other of the two junctions V1, V2 as the second junction V2 and open jointly into the first portion.

In order to optimally use the heat admitted from the condenser 26 into the heating branch 24 for heating the passenger compartment 10, the heating circuit 24 can be shut off via a shut-off valve 32. For this purpose, the shut-off valve 32 is arranged here in the feed 31 of the heating circuit 24. In addition, a heating loop 36 is formed via a recycling branch 34, by means of which heating loop coolant is returned from a first branching-off point 38 downstream of the heating heat exchanger 14 to a second branching-off point 40 of the heating branch 24 upstream of the condenser 26. The heating branch 24 extends between the first branching-off point 38 and the second branching-off point 40. The feed 31 of the heating branch 24 is arranged upstream of the second branching-off point 40 and downstream of the first junction V1. The feed 31 of the heating branch 24 can be shut off by means of the shut-off valve 32, and therefore the heating loop 36 can be operated substantially independently of the remaining coolant circuit 6. In the heating mode, the heating branch 24 is then correspondingly shut off by means of the shut-off valve 32, and therefore the coolant is recurrently conducted in the heating loop 36 via the condenser 26, the auxiliary heater 28 and the heating heat exchanger 14.

Parallel to the heating branch 24, the coolant circuit 6 has the cooling branch 33, for cooling at least one vehicle component 42 of the vehicle. In the exemplary embodiment shown here, only one vehicle component 42 is shown, without restricting the generality. Accordingly, embodiments having a plurality of vehicle components 42 in principle also come into consideration. The heat absorbed via the vehicle component 42 is either removed via an LT cooler 44 in the coolant circuit 6 to the surroundings of the vehicle or transmitted into the refrigeration circuit 4 by means of a chiller 46. For this purpose, the chiller 46 is connected in the cooling branch 33 in particular downstream of the vehicle component 42. Furthermore, the chiller 46 has a chiller evaporator via which the chiller 46 is connected to the refrigeration circuit 4. In combination with the condenser 26, the chiller 46 forms in particular a heat pump for transmitting heat from the cooling branch 33 into the heating branch 24. In addition, it is additionally or alternatively also possible to extract heat from the surroundings via the LT cooler 44 and then to use the heat by means of the chiller 46 and the condenser 26 for heating the passenger compartment 10.

In the refrigeration circuit 4, an expansion valve 48 is connected upstream of the chiller 46. Similarly, an expansion valve 48 is connected upstream of the air conditioning evaporator 12. Furthermore, a compressor 50 is arranged in the refrigeration circuit 4, namely upstream of the condenser 26. The quantity of heat transmitted in each case from the coolant circuit 6 into the refrigeration circuit 4 is set by means of the expansion valves 48. Alternatively or additionally, such a setting is undertaken by setting a compressor capacity of the compressor 50.

The chiller 46 and the air conditioning evaporator 12 are arranged parallel to each other in the refrigeration circuit 4. In addition, in the exemplary embodiment shown here, a further evaporator 52 is additionally connected to the refrigeration circuit 4 parallel to the air conditioning evaporator 12 and the chiller 46. Said further evaporator 52 serves, for example, for cooling a high voltage accumulator (not shown specifically) of the vehicle. An expansion valve 48 is also assigned to the further evaporator 52.

Furthermore, in the exemplary embodiment shown here, two internal heat exchangers 54 and 56 are connected to the refrigeration circuit 4. The internal heat exchanger 54 serves for increasing the capacity and efficiency of the air conditioning evaporator 12, and the further internal heat exchanger 56 correspondingly for increasing the capacity and efficiency of the chiller 46. The variant embodiment shown here with two internal heat exchangers 54, 56 is suitable particularly for a vehicle in which the components of the refrigeration circuit 4 are arranged distributed in the vehicle. By contrast, in an alternative (not shown), only one internal heat exchanger 54 is provided in the refrigeration circuit 4, said heat exchanger then being jointly used for the air conditioning evaporator 12 and the chiller 46. In this embodiment, the chiller 46 and the air conditioning evaporator 12 are then accommodated in a spatial vicinity to each other in the vehicle, for example in the front region, and have a common feed and also return, which are then thermally coupled by means of the internal heat exchanger 54.

By means of the heat pump system 2 shown in FIG. 1, optimum climate control of the passenger compartment 10 can be achieved in a particularly flexible manner and in a multiplicity of different situations. Thus, in a heating mode, heat is supplied to the air L by means of the heating heat exchanger 14. For this purpose, in particular, the shut-off valve 32 is closed and the heating loop 36 is operated independently of the rest of the coolant circuit 6. Primarily serving as the heat exchanger is the condenser 26, more precisely the heat pump which is formed from the condenser 26, the compressor 50 and the chiller 46 and provides heat from the vehicle component 42 and/or from the environment by means of the LT cooler 44. If the quantity of heat introduced into the heating loop 36 via the condenser 26 is not sufficient in order to sufficiently serve an existing heating requirement, the auxiliary heater 28 is correspondingly switched on in the heating mode in order to generate the remaining heat. The heating mode is in particular a winter mode and is suitable primarily at particularly low external temperatures, for example at minus degrees or else at plus degrees, if cooling is not intended to take place simultaneously.

Furthermore, the heat pump system 2 has a cooling mode in which the air L flowing into the passenger compartment 10 is cooled by means of the air conditioning evaporator 12. The cooling mode is therefore in particular also a summer mode. The heating heat exchanger 14 is not required in the cooling mode and the hot coolant flows therethrough without heat exchange in the air conditioning unit 8. In order to remove the heat admitted from the condenser 26 into the heating branch 24, the shut-off valve 32 is open in the cooling mode such that the heating branch 24 is connected to the coolant circuit 6 for exchanging coolant. The condenser 26 then forms a series connection with the heating heat exchanger 14 and the LT cooler 44 such that heat is correspondingly output from the heating branch 24 and the vehicle component to the surroundings via the LT cooler 44. In order to avoid bypassing the condenser 26 and the heating heat exchanger 14 via the recycling branch 36, a nonreturn valve 58 is arranged in the latter, and therefore, when the shut-off valve 32 is open, the coolant has to pass completely past the condenser 26.

Owing to the special circuitry of the heat pump system 2, the latter also has a plurality of mixed modes which serve as transition modes between the heating mode and the cooling mode. The mixed modes therefore permit particularly flexible adaptation to the requirements made of the heat pump system 2.

Thus, in a first mixed mode of the heat pump system 2, starting from the heating mode the air conditioning evaporator 12 is also switched on by the expansion valve 48 connected upstream of the latter being at least partially opened, and therefore the air L flowing into the passenger compartment 10 is first of all cooled and is subsequently heated again via the heating heat exchanger 14. This in particular achieves dehumidification of the air L. The first mixed mode is then suitable in particular for dehumidification and for climate control at relatively low external temperatures, for example within the range of 0 to +15° C., in which typically heating of the interior is still desired, but misting of the window panes of the vehicle is additionally intended to be prevented.

In a second mixed mode, the heat provided via the heating heat exchanger 14 for heating the interior is retracted by the quantity of heat which is transmitted from the chiller 46 into the refrigeration circuit 4 being reduced. For this purpose, in particular the expansion valve 48 which is assigned to the chiller 46 is at least partially or even completely closed, and therefore the transfer of heat from the coolant circuit 6 into the refrigeration circuit 4 is correspondingly reduced. The shut-off valve 32 typically continues to be permanently shut off here.

For the removal of the excess heat in the heating branch 24, the shut-off valve 32 is temporarily opened in a third mixed mode.

In the exemplary embodiment shown here, as further components, the coolant circuit 6 comprises an LT cooler bypass 60 which can be shut off by means of a bypass valve 62, which is designed here as a shut-off valve. By opening the shut-off valve 32, the coolant is then at least partially guided past the LT cooler 44. Furthermore, an equalizing container 64 is connected to the coolant circuit 6 parallel to the LT bypass 60 and to the LT cooler 44. Furthermore, a pump 66 for conveying the coolant is arranged in the coolant circuit 6. In the exemplary embodiment shown here, said pump is connected upstream of the two branches 24, 40 and downstream of the LT cooler 44.

LIST OF REFERENCE SIGNS

2 Heat pump system
4 Refrigeration circuit

6 Coolant circuit
8 Air conditioning unit
10 Passenger compartment
12 Air conditioning evaporator
14 Heating heat exchanger
16 Air duct
18 Air bypass
20 Mixed air control
22 Control unit
24 Heating branch
26 Condenser
28 Auxiliary heater
30 Heating circuit pump
31 Feed (of the heating branch)
32 Shut-off valve
33 Cooling branch
34 Recycling branch
36 Heating loop
38 First branching-off point
40 Second branching-off point
42 Vehicle component
44 LT cooler
46 Chiller
48 Expansion valve
50 Compressor
52 Further evaporator
54 Internal heat exchanger
56 Further internal heat exchanger
58 Nonreturn valve
60 LT cooler bypass
62 Bypass valve
64 Equalizing container
66 Pump
L Air
V1 First junction
V2 Second junction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat pump system for climate control of a vehicle, comprising:
    an air conditioning unit having an air conditioning evaporator and a heating heat exchanger, for air conditioning a passenger compartment of the vehicle;
    a condenser for transmitting heat from a refrigeration circuit into a coolant circuit;
    a chiller for transmitting heat from the coolant circuit into the refrigeration circuit;
    a low temperature cooler;
    a shut-off valve arranged between the low temperature cooler and the condenser, and
    a control unit,
    wherein
        the coolant circuit has two branches which are parallel to one another downstream of the low temperature cooler,
        a first branch of the two branches being a heating branch that can be shut-off from an outlet of the low temperature cooler by the shut-off valve, and a second branch of the two branches being a cooling branch in which the chiller and at least one vehicle component are arranged,
        the condenser and the heating heat exchanger are arranged in the heating branch and are connected in series to one another with the heating heat exchanger downstream of the condenser,
        a heating branch pump is arranged in the heating branch,
        the control unit is configured to control closure the shut off valve such that serial flow occurs in a heating loop through the heating branch pump, the condenser and the heating heat exchanger and return to the heating branch pump without the serial flow passing through the low temperature cooler,
        the control unit is configured to control the heat pump system such that the serial flow in the heating loop is operable independently of the rest of the coolant circuit, while coolant flow is passable through the low temperature cooler.

2. The heat pump system as claimed in claim 1, further comprising:
    a nonreturn valve arranged in the heating branch between the heating heat exchanger and an inlet of the condenser.

3. The heat system as claimed in claim 1, wherein
    the air conditioning unit has an air duct, for supplying air into the passenger compartment,
    the heating heat exchanger is arranged in the air duct downstream of the air conditioning evaporator, and
    the air duct has an air bypass for bypassing the heating heat exchanger.

4. The heat pump system as claimed in claim 1, wherein control unit is configured such that the heat pump system is switched over between a plurality of operating modes, including at least a cooling mode and a heating mode.

5. The heat pump system as claimed in claim 4, wherein in the heating mode the heating branch is shut off and the chiller is activated.

6. The heat pump system as claimed in claim 4, further comprising:
    an expansion valve for setting a cooling capacity of the air conditioning evaporator, the expansion valve being arranged in the refrigeration circuit upstream of the air conditioning evaporator, wherein, in a first mixed mode, both the air conditioning evaporator and the heating heat exchanger are activated.

7. The heat pump system as claimed in claim 6, further comprising:
    an expansion valve for setting the quantity of heat which the chiller transmits into the coolant circuit, the expansion valve being arranged in the refrigeration circuit upstream of the chiller, wherein, in a second mixed mode, the quantity of heat is reduced in comparison to a maximum quantity.

8. The heat pump system as claimed in claim 7, wherein the heat pump system has a third mixed mode in which the heating branch is temporarily open.

9. The heat pump system as claimed in claim 4, wherein in the cooling mode the heating branch is open and the chiller is deactivated.

10. The heat pump system as claimed in claim 1, further comprising:
    an internal heat exchanger which couples a feed and a return of the chiller thermally to each other arranged in the refrigeration circuit.

11. The heat pump system as claimed in claim 10, wherein the air conditioning evaporator is connected parallel to the internal heat exchanger and the chiller, and a further internal heat exchanger is arranged, which couples a feed and a return of the air conditioning evaporator thermally to each other.

12. A method for operating a heat pump system as claimed in claim 1, wherein
the heat pump system is switched over between a plurality of operating modes, including at least between a heating mode for interior heating and a cooling mode for interior cooling.

13. The method as claimed in claim 12, wherein
the heat pump system is switched over into a first mixed mode by the passenger compartment being heated via the heating heat exchanger and at the same time being cooled via the air conditioning evaporator for dehumidification.

14. The method as claimed in claim 13, wherein
the heat pump system is switched over into a second mixed mode by the heat transmitted from the chiller into the refrigeration circuit being reduced.

15. The method as claimed in claim 14, wherein, in a third mixed mode, the heating branch is temporarily opened.

* * * * *